United States Patent
Ahmad et al.

(10) Patent No.: US 8,074,016 B2
(45) Date of Patent: Dec. 6, 2011

(54) DATA LOSS PREVENTION DURING A FALL OF A STORAGE DEVICE

(75) Inventors: Munir Ahmad, Austin, TX (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 12/467,788

(22) Filed: May 18, 2009

(65) Prior Publication Data
US 2010/0290149 A1 Nov. 18, 2010

(51) Int. Cl.
*G06F 12/00* (2006.01)
(52) U.S. Cl. ........ 711/113; 711/100; 711/112; 711/111; 711/170
(58) Field of Classification Search .................. 711/113, 711/100, 112, 111, 170
See application file for complete search history.

(56) References Cited

U.S. PATENT DOCUMENTS

| | | |
|---|---|---|
| 5,227,929 A | 7/1993 | Comerford |
| RE35,269 E | 6/1996 | Comerford |
| 5,654,840 A | 8/1997 | Patton et al. |
| 5,982,573 A | 11/1999 | Henze |
| 6,046,877 A | 4/2000 | Kelsic |
| 7,369,345 B1 | 5/2008 | Li et al. |
| 2007/0109679 A1 | 5/2007 | Han et al. |
| 2007/0159710 A1 | 7/2007 | Lucas et al. |

OTHER PUBLICATIONS http://www.interfacebus.com/SATA_Pinout.html, Jun. 12, 2009.

*Primary Examiner* — Thong Q Le
(74) *Attorney, Agent, or Firm* — Haynes and Boone, LLP

(57) ABSTRACT

A data storage device having fall protection includes a rotatable media platter operable to receive and store data, a read/write head operable to communicate with the media platter by writing the data to the media platter and by reading the data from the media platter, an arm supporting the read/write head, a servo motor coupled the arm and operable to move the arm to and from the media platter, a drive controller operable to control the media platter, the read/write head and the servo motor, and a general purpose input/output (GPIO). In an embodiment, the GPIO is coupled with a fall sensor that is external to the data storage device so that when the fall sensor sends a floating interrupt trigger, signaling that the fall sensor is falling, the GPIO receives the interrupt trigger and the drive controller performs an emergency routine to cache data in flight to or from the data storage device and park the read/write head away from the media platter.

20 Claims, 7 Drawing Sheets

Fig. 4

SATA SPEC - PIN DEFINITION  100

| | NAME | TYPE | DESCRIPTION | CABLE USAGE[2,3] | BACKPLANE USAGE[3] |
|---|---|---|---|---|---|
| SIGNAL SEGMENT | S1 | GND | | 1ST MATE | 2ND MATE |
| | S2 | A+ | DIFFERENTIAL SIGNAL PAIR A | 2ND MATE | 3RD MATE |
| | S3 | A− | | 2ND MATE | 3RD MATE |
| | S4 | GND | | 1ST MATE | 2ND MATE |
| | S5 | B− | DIFFERENTIAL SIGNAL PAIR B | 2ND MATE | 3RD MATE |
| | S6 | B+ | | 2ND MATE | 3RD MATE |
| | S7 | GND | | 1ST MATE | 2ND MATE |
| KEY AND SPACING SEPARATE SIGNAL AND POWER SEGMENTS ||||||
| POWER SEGMENT | P1 | $V_{3.3}$ | 3.3V POWER | 2ND MATE | 3RD MATE |
| | P2 | $V_{3.3}$ | 3.3V POWER | 2ND MATE | 3RD MATE |
| | P3 | $V_{3.3}$ | 3.3V POWER, PRE-CHARGE | 1ST MATE | 2ND MATE |
| | P4 | GND | 3.3V POWER, PRE-CHARGE | 1ST MATE | 1ST MATE |
| | P5 | GND | | 1ST MATE | 2ND MATE |
| | P6 | GND | | 1ST MATE | 2ND MATE |
| | P7 | $V_5$ | 5V POWER, PRE-CHARGE | 1ST MATE | 2ND MATE |
| | P8 | $V_5$ | 5V POWER | 2ND MATE | 3RD MATE |
| | P9 | $V_5$ | 5V POWER | 2ND MATE | 3RD MATE |
| | P10 | GND | | 1ST MATE | 2ND MATE |
| | P11 | DAS / DSS | DEVICE ACTIVITY SIGNAL / DISABLE STAGGERED SPINUP/ CACHE DATA, PARK HEAD | 2ND MATE | 3RD MATE |
| | P12 | GND | | 1ST MATE | 1ST MATE |
| | P13 | $V_{12}$ | 12V POWER, PRE-CHARGE | 1ST MATE | 2ND MATE |
| | P14 | $V_{12}$ | 12V POWER | 2ND MATE | 3RD MATE |
| | P15 | $V_{12}$ | 12V POWER | 2ND MATE | 3RD MATE |

194 → P11

NOTE:
1. THE CORRESPONDING PIN TO BE MATED WITH P11 IN THE POWER CABLE RECEPTACLE CONNECTOR SHALL ALWAYS BE GROUNDED. FOR SPECIFIC OPTIONAL USAGE OF P11 SEE SECTION 6.6 OF SATA SPECIFICATION
2. ALTHOUGH THE MATE ORDER IS SHOWN, HOT PLUGGING IS NOT SUPPORTED WHEN USING THE CABLE CONNECTOR RECEPTACLE
3. ALL MATE SEQUENCES ASSUME ZERO ANGULAR OFFSET BETWEEN CONNECTORS
4. THE SIGNAL SEGMENT AND POWER SEGMENT MAY BE SEPARATE

DATA LOSS PREVENTION DURING A FALL OF A STORAGE DEVICE

BACKGROUND

The present disclosure relates generally to information handling systems, and more particularly to protection and data loss prevention of data and data storage devices during a fall of the information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In the ever-growing mobile society, many of the IHSs today are mobile, notebook-type IHSs. With this mobility, there comes a risk of the IHS being dropped. Hard disk drives (HDDs) in notebook computers are susceptible to mechanical shock and damage from falls, drops or other high-shock events. As should be understood, an HDD read/write head positioned over a data storage platter may crash into the surface of the platter upon impact of the IHS/HDD and either corrupt the data and/or make the HDD unusable. This can result in physical damage to the read/write head of the HDD, damage to the rotating media platter(s), damage to the data storage on the rotating media platter(s) and/or damage to the data in process of being read from or written to the HDD near the time of the shock.

To combat this, some higher-end HDDs (e.g., 7200 rpm HDDs) incorporate an accelerometer sensor within the HDD to detect a free fall of the device. See FIG. 6. Upon detection of a fall event by the sensor, the HDD initiates an emergency routine by communicating from the internal drop sensor to the drive controller via an internally coupled general purpose input/output (GPIO). The emergency routine stores the data being transferred to/from the HDD and parks the drive read/write head. However, having the drop sensor internal to the HDD device, does not allow for the sensor to be used by IHS applications for other purposes, such as for gaming applications. Also, due to increased cost, these integrated, internal sensors have not become common in the lower-end, commodity drives (e.g., 5400 or 4200 rpm HDDs). However, there is a need for free fall protection in all notebook HDD products to protect the data and the HDDs. Also, because a "HEAD PARK EVENT" is generally controlled by a device manufacturer, when a Fall happens, each device in an IHS may behave differently and unpredictably.

Another solution for IHS free fall sensing is to place a drop sensor external to the HDD (e.g, on the motherboard of the IHS). See FIG. 7. When a fall event is detected by the sensor, the system sends a drive "idle immediate with unload" command via the standard SATA communication data path interface to the HDD drive controller. This solution, using a sensor external to the HDD and communicating via the standard SATA communication data path interface is very slow in comparison to the internal sensor system due to communication protocol for the standard SATA interface. For example, the internal sensor model discussed above with respect to FIG. 6 provides a maximum 160 ms response time, or approximately 5" worth of fall for the HDD to react (typical minimum depends on how fast the HDD device can park). To the contrary, this external sensor system using the standard SATA communication data path interface provides an approximately 300 ms response time. As such, the time interval between recognizing that the device is falling and the emergency response on this system may not perform the drive read/write head park before the IHS impacts a surface if the fall is approximately 18" or greater.

As should be understood, the intent of the emergency routines discussed above is to immediately move the HDD read/write head away from the data storage platter(s) before the IHS/HDD impacts a surface. Data integrity and mechanical shock protection of a HDD is increased with the addition of a free fall sensor. However, a problem with the system shown in FIG. 6 is that this type of system tends to be incorporated only in high performance drives and the sensor is integrated internally into the HDD, wherein the sensor data is limited to use within the HDD (e.g., the data cannot be utilized in a real time fashion by the IHS for other system level purposes). Also, because "HEAD PARK EVENT" is generally controlled by a device manufacturer, when a Fall happens, each device in an IHS may behave differently and unpredictably. A problem with the system shown in FIG. 7 is that the response time is comparatively very slow and there may not be any protection against data loss in the event HDD falls from a drop height of less than 18" in a IHS.

Accordingly, it would be desirable to provide for improved data storage device fall protection, absent the deficiencies discussed above.

SUMMARY

According to one embodiment, a data storage device having fall protection includes a rotatable media platter operable to receive and store data, a read/write head operable to communicate with the media platter by writing the data to the media platter and by reading the data from the media platter, an arm supporting the read/write head, a servo motor coupled the arm and operable to move the arm to and from the media platter, a drive controller operable to control the media platter, the read/write head and the servo motor, and a general purpose input/output (GPIO). In an embodiment, the GPIO is coupled with a fall sensor that is external to the data storage device so that when the fall sensor sends an interrupt trigger, signaling that the fall sensor is falling, the GPIO receives the interrupt trigger and the drive controller performs an emergency routine to cache data in flight to or from the data storage device and park the read/write head away from the media platter.

BRIEF DESCRIPTION OF THE DRAWINGS

FIG. 4 illustrates a table showing standard pin definitions for SATA data storage devices (e.g., the HDD of FIGS. 1-2), and adding a new definition for pin 11.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
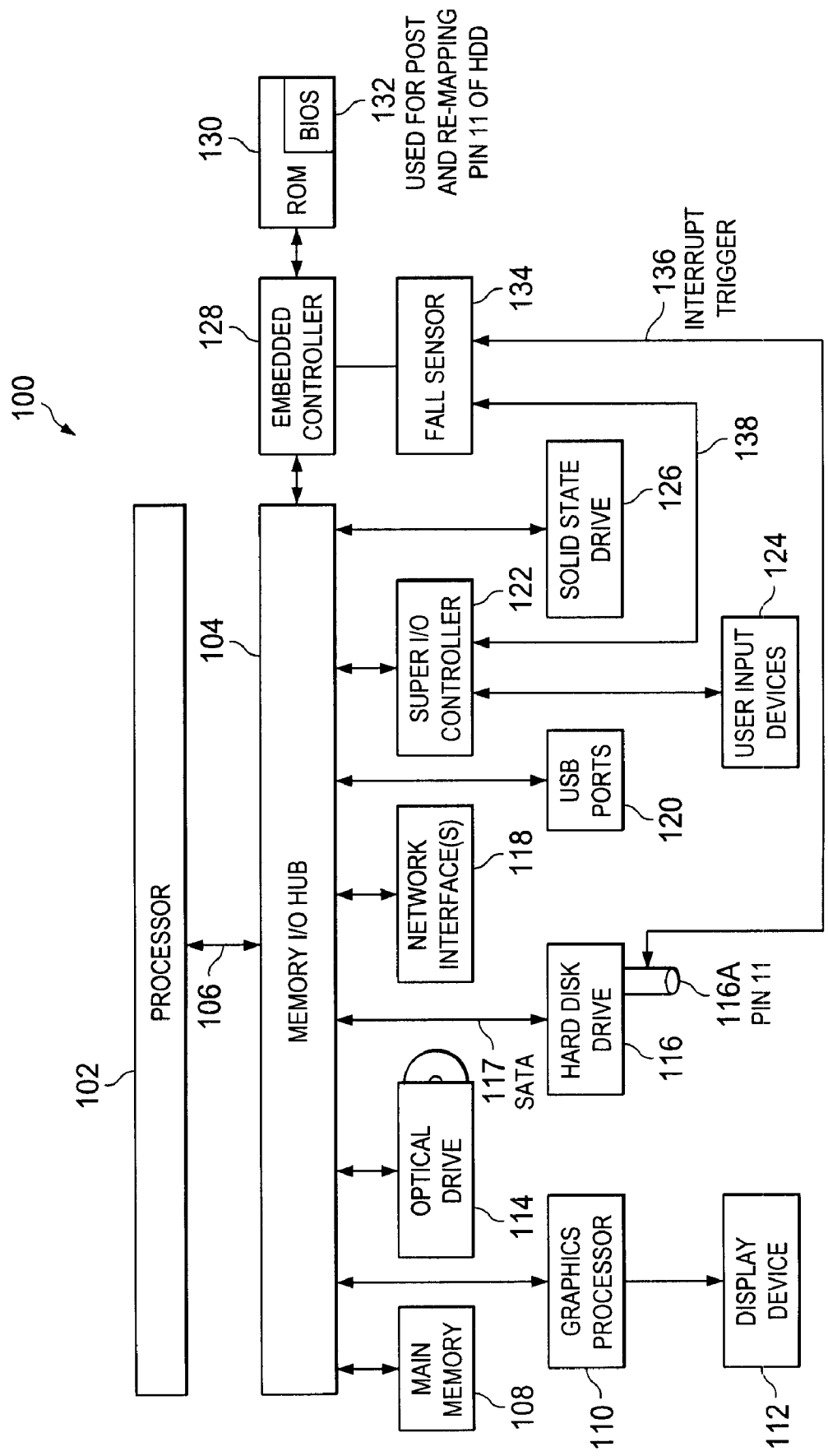
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. The front-side bus 106 may also be known as a North Bridge. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives (HDD) 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100. traditional hard disk drives are commonly known in the art and the general workings of which are not repeated here for brevity. In an embodiment, the HDD 116 is a Serial Advanced Technology Attachment (SATA) type hard disk drive. SATA is a common standard of communication and is generally understood as a computer bus storage-interface for coupling data storage devices, such as the HDD 116, with the an IHS, such as the IHS 100. In an embodiment, the data bus 117 is a SATA communication bus. The SATA standard traditionally uses connection pin definitions shown in FIG. 4. However, it is noted that the pin definition chart shown in FIG. 4 modifies the traditional SATA connection pin definitions by providing a new definition 194 for the use of connection pin 11, 116A, which is a general purpose input/output (GPIO), to be used for an emergency interrupt trigger routine, as will be described in more detail below.

An embodiment of the IHS 100 also includes an embedded controller 128 coupled with the memory I/O hub 104. The embedded controller 128 operates to help direct communications via the memory I/O hub 104. In addition, the embedded controller 128 couples with read only memory (ROM) 130. The ROM 130 stores information used by the IHS 100, and includes the basic input/output system (BIOS) 132. As should be understood, the BIOS 132 may be used for starting operations of the IHS 100, such as a power-on self-test (POST). In addition, the BIOS 132 of the present disclosure may be used for re-defining the uses of pin 11, 116A (e.g., the definition 194 shown in FIG. 4) of the HDD 116, as will be described in more detail below.

Figure 5:
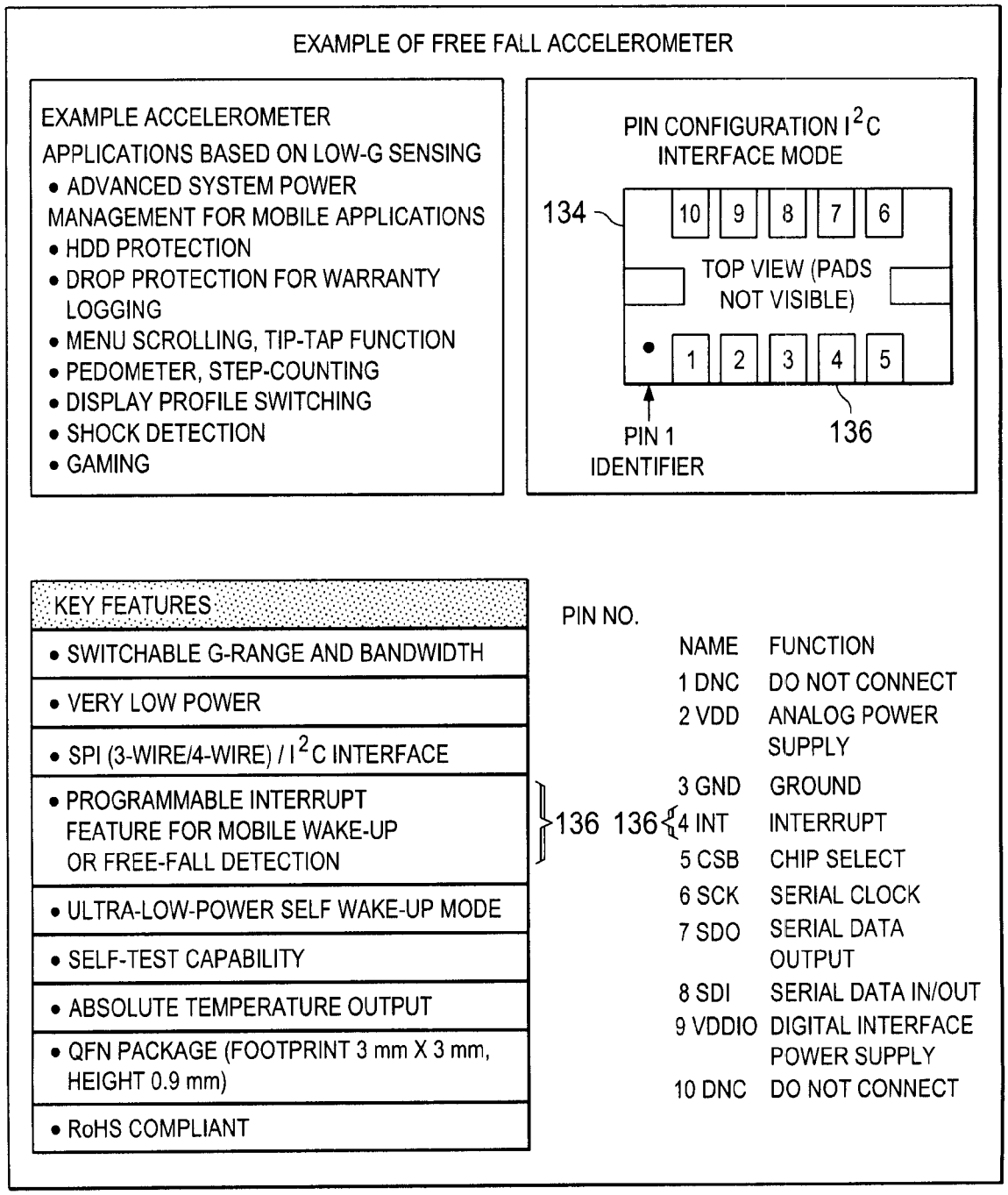
FIG. 5 illustrates an embodiment of an accelerometer operable for use as the drop sensor shown in FIGS. 1-2.

In addition, an embodiment as shown in FIG. 1 includes a fall sensor 134 coupled with the embedded controller 128. In an embodiment, the fall/drop sensor 134 is a three-axis accelerometer operable to determine acceleration/orientation of the sensor 134 along three directions represented by each axis. A pin-out diagram of an embodiment of the fall sensor 134 is shown in FIG. 5. Other pin-outs and other embodiments of accelerometers may be used as the fall sensor 134. Additionally, other types of fall sensors may be used with the present disclosure. Using an accelerometer as the sensor 134, one can determine if the sensor 134 is in free fall when the each of the axis' values approach zero. The fall sensor 134 also includes an interrupt trigger signal 136 that, in an embodiment, communicatively couples with GPIO pin 11, 116A of the HDD 116. It should be understood by those having ordinary skill in the art the any GPIO of the HDD 116 may be used with embodiments of the present disclosure.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
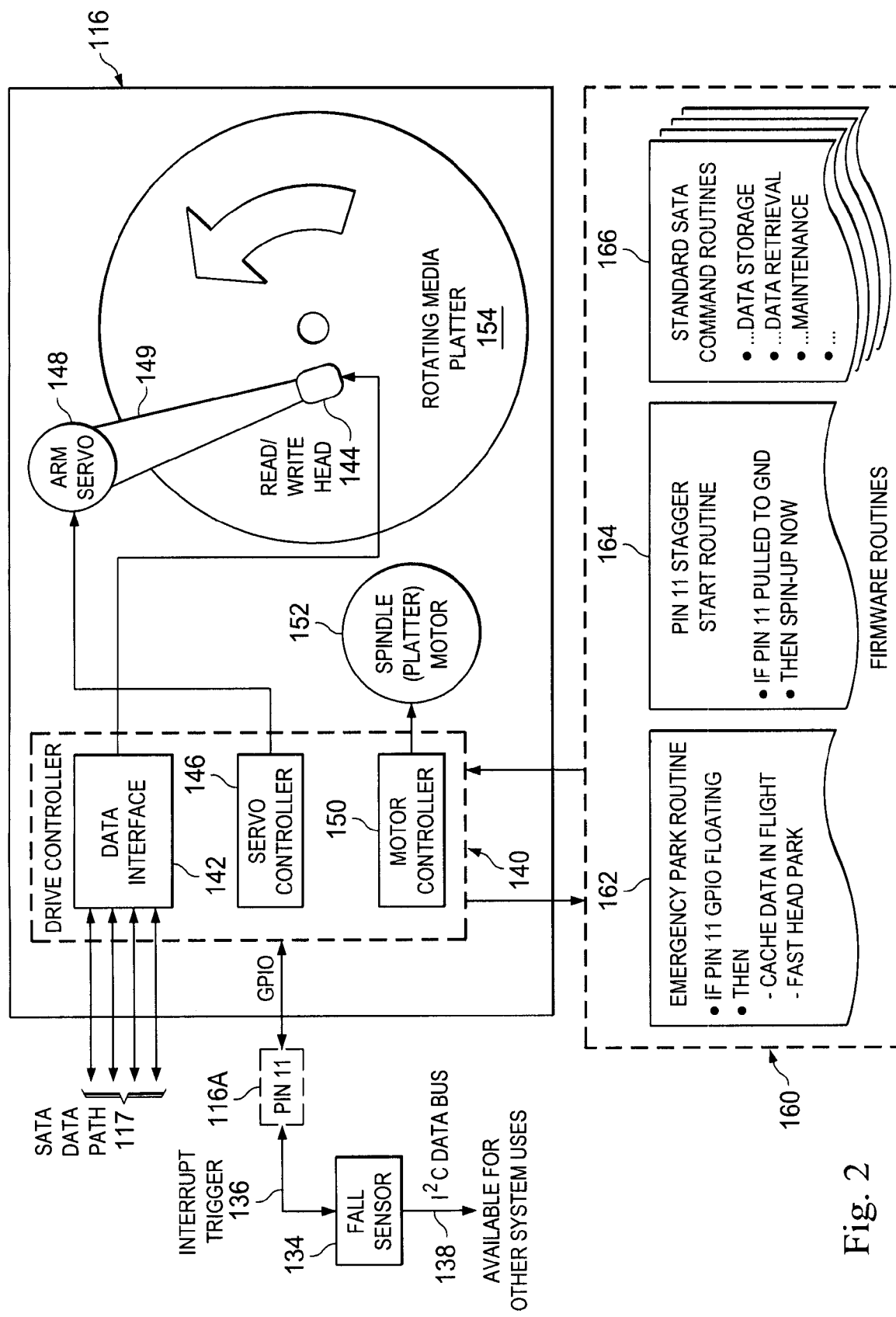
FIG. 2 illustrates a block diagram of an embodiment of a hard disk drive (HDD) coupled with an external drop sensor to sense falling of the IHS of FIG. 1.

FIG. 2 illustrates a block diagram of an embodiment of a hard disk drive (HDD) 116 coupled with an external drop sensor 134 to sense falling of the IHS 100. The embodiment shown in FIG. 2 is illustrated using a hard disk drive. However, any device having moving parts and is subject to damage upon a sudden shock may benefit from the present disclosure. The HDD 116 includes a drive controller 140 for controlling operations of the HDD 116, including reading and writing data to and from the HDD 116. A data interface 142 couples the HDD 116 to the IHS 100 via the SATA communication bus 117. The communication on the bus 117 may be traditional SATA communication, as should be understood in the art. The communication on the bus 117 may include serial and/or parallel communication. The data interface 142 communicates information to and from the read/write head 144. As should be understood, the read/write head 144 writes and reads information to and from the one or more rotating media platters 154. As should also be understood, the rotating media platter 154 may be magnetic, optical or some other type of data storage medium. A servo controller 146 couples with an arm servo 148 to move the arm 149. Moving the arm 149 allows the head 144 to communicate information to different locations on the media platter 154. A motor controller 150 controls operation of a spindle motor 152. Spinning the motor 152 causes the rotating media platter 154 to rotate. With the rotating media platter 154 and the moving arm 149, information can be communicated to and from a large portion of the surface of the media platter 154. Any number of read/write heads 144, arm servos 148, arms 149, motors 152, and/or media platters 154 may be used in the HDD 116.

In an embodiment, the HDD 116 couples with the fall sensor 134 via a GPIO 116 of the drive controller 140. If the IHS 100 is dropped or otherwise falls, the fall sensor 134 detects this falling and sends an emergency interrupt trigger signal 136 to the GPIO input 116A of the HDD 116. This emergency interrupt trigger signal 136 bypasses the traditional SATA communication bus 117 and is thus much faster to reach the drive controller 140 to activate an emergency park routine. In an embodiment, the pin 4 programmable interrupt 136 of the fall sensor 134 couples with the pin 11 GPIO 116A of the HDD 116. In an embodiment, the fall sensor 134 may include one or more additional outputs for communicating with the IHS 100 for allowing the sensor 134 to be utilized in other applications, such as gaming applications. In an embodiment, an I²C data bus 138 is used to couple the sensor 134 with the super I/O controller 122. I²C is also known as the Inter-Integrated Circuit communication standard (e.g., I²C) and is used for coupling peripheral devices with an IHS 100 motherboard, embedded system, or other similar devices.

After an initial start-up power-on self-test (POST) of the IHS 100 the BIOS 132 may re-map or re-define the operation of the HDD 116 in response to an input received on the GPIO (e.g., pin 11) 116A of the HDD 116 so that the drive controller 140 recognizes the interrupt trigger 136 as an emergency. After receiving the interrupt trigger 136, the drive controller 140 immediately caches in memory any information in flight to and/or from the HDD 116 and orders the arm servo 148 to park the arm 149 away from the media platter 154. As such, the arm 149 and/or the head 144 are less likely to damage the media platter 154 and/or to damage information stored on the platter 154 or in flight.

Figure 6:
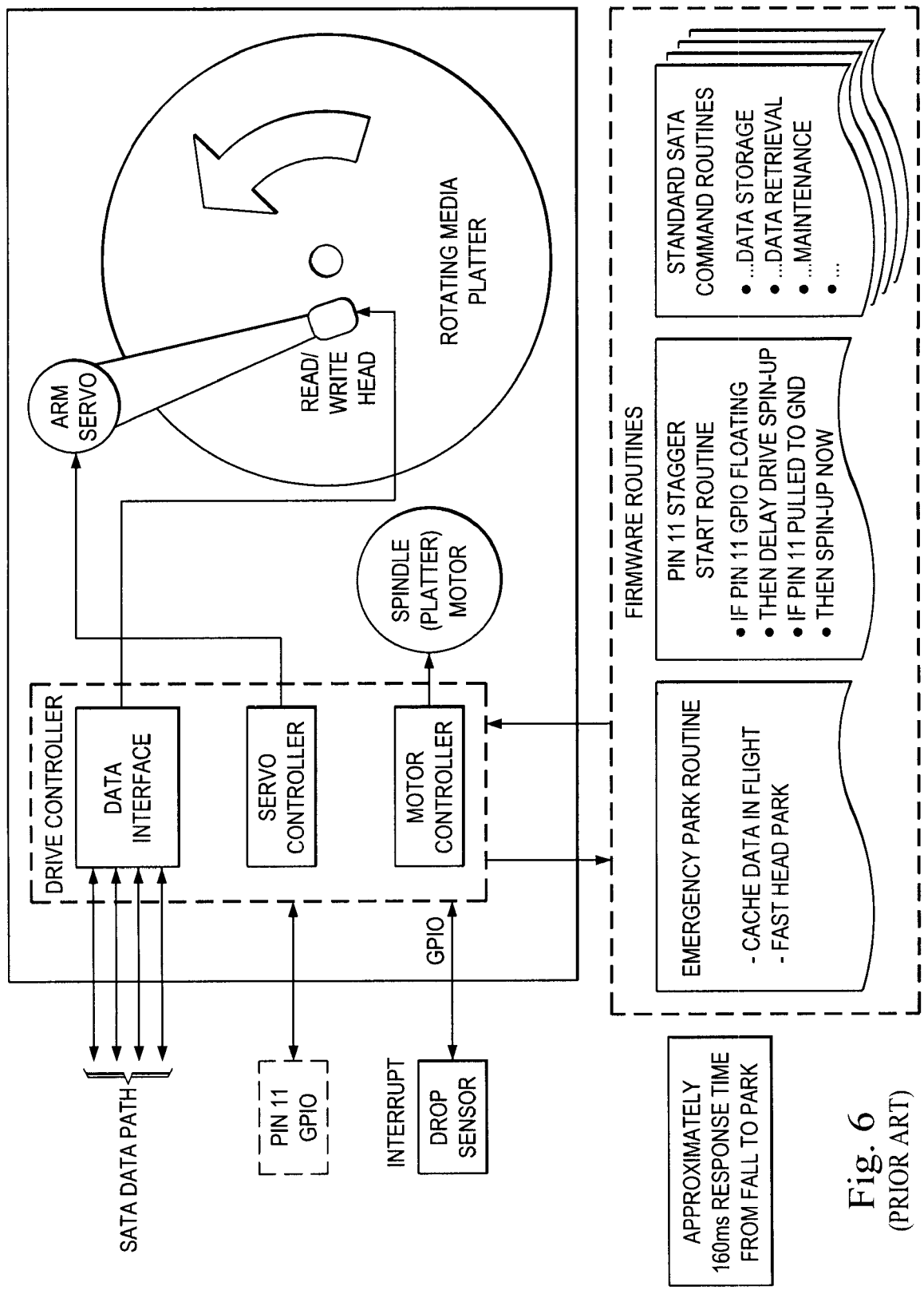
FIG. 6 illustrates a prior art embodiment of an internal drop sensor in an HDD.
Figure 7:
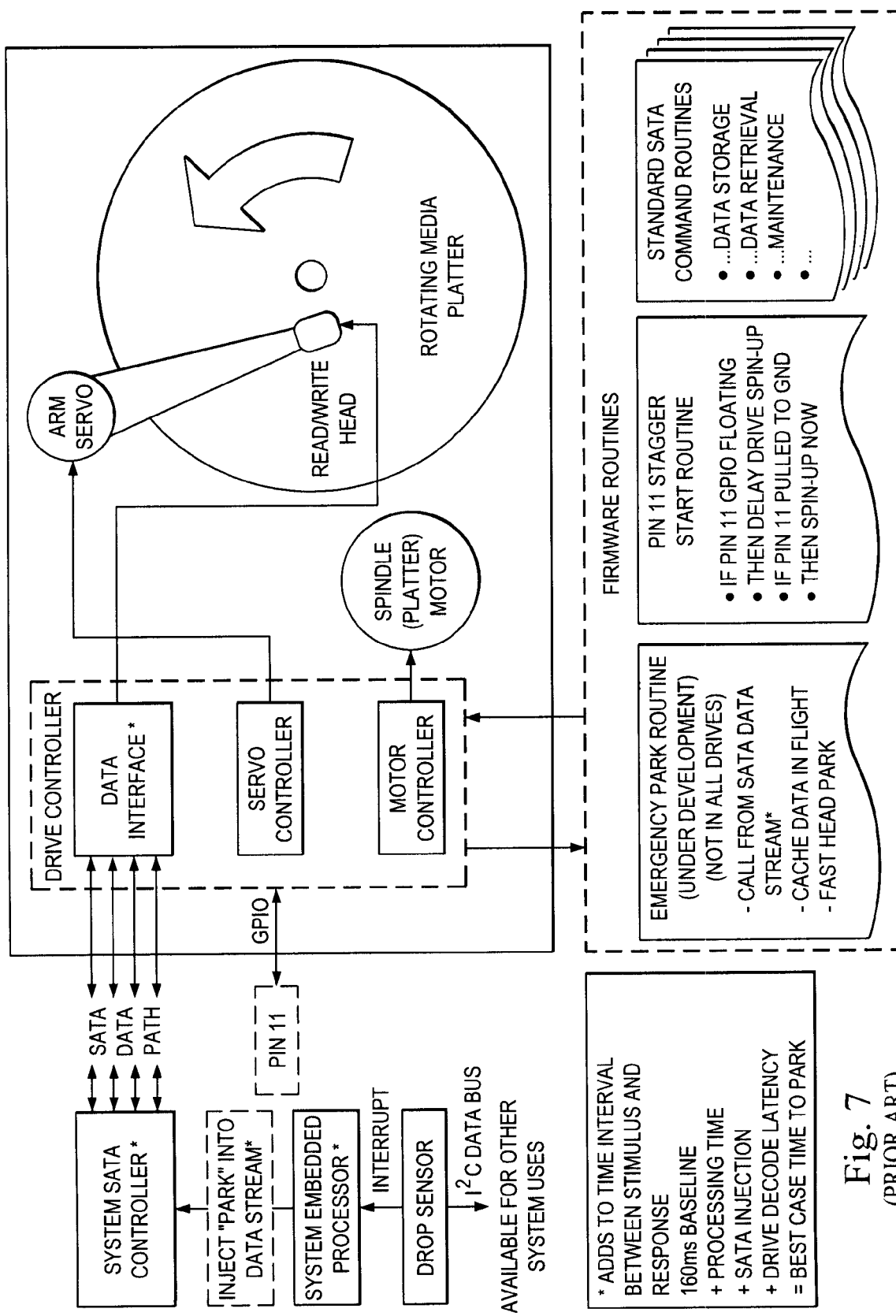
FIG. 7 illustrates a prior art embodiment of an external drop sensor using a standard SATA communication data path interface.

Firmware routines 160 are also shown in FIG. 2. Exemplary firmware routines 160 are the emergency park routine 162, the pin 11 stagger start routine 164 and the standard SATA command routines 166. Standard SATA command routines 166 will operate in embodiments of the present disclosure substantially similar to like routines for other HDDs, as can be seen in FIGS. 6 and 7. However, the pin 11 stagger start routine 164 and the emergency park routine 162 of the present disclosure operate differently than that of the prior shown in FIGS. 6-7 after the POST and the BIOS 132 re-maps or redefines the operation of pin 11, 116A of the HDD 116, as shown in at 194 in FIG. 4. In an embodiment, the pin 11 stagger start routine 164 still follows the SATA standard routine for spinning-up the media platter 154 via the motor 152 and the motor controller 150 when pin 11 GPIO 116A is pulled to ground. However, the stagger start routine 164 no longer performs the SATA standard delayed spin-up when the pin 11 GPIO 116A is triggered after the BIOS 132 re-defines the function of the pin 11 GPIO 116A at 194. Instead a non-grounded (floating or active 3.3 v) pin 11 GPIO 116A causes the emergency park routine 162 to quickly cache any information in flight to or from the HDD 116 and park the head 144 and the arm 149 away from the media platter 154.

Figure 3:
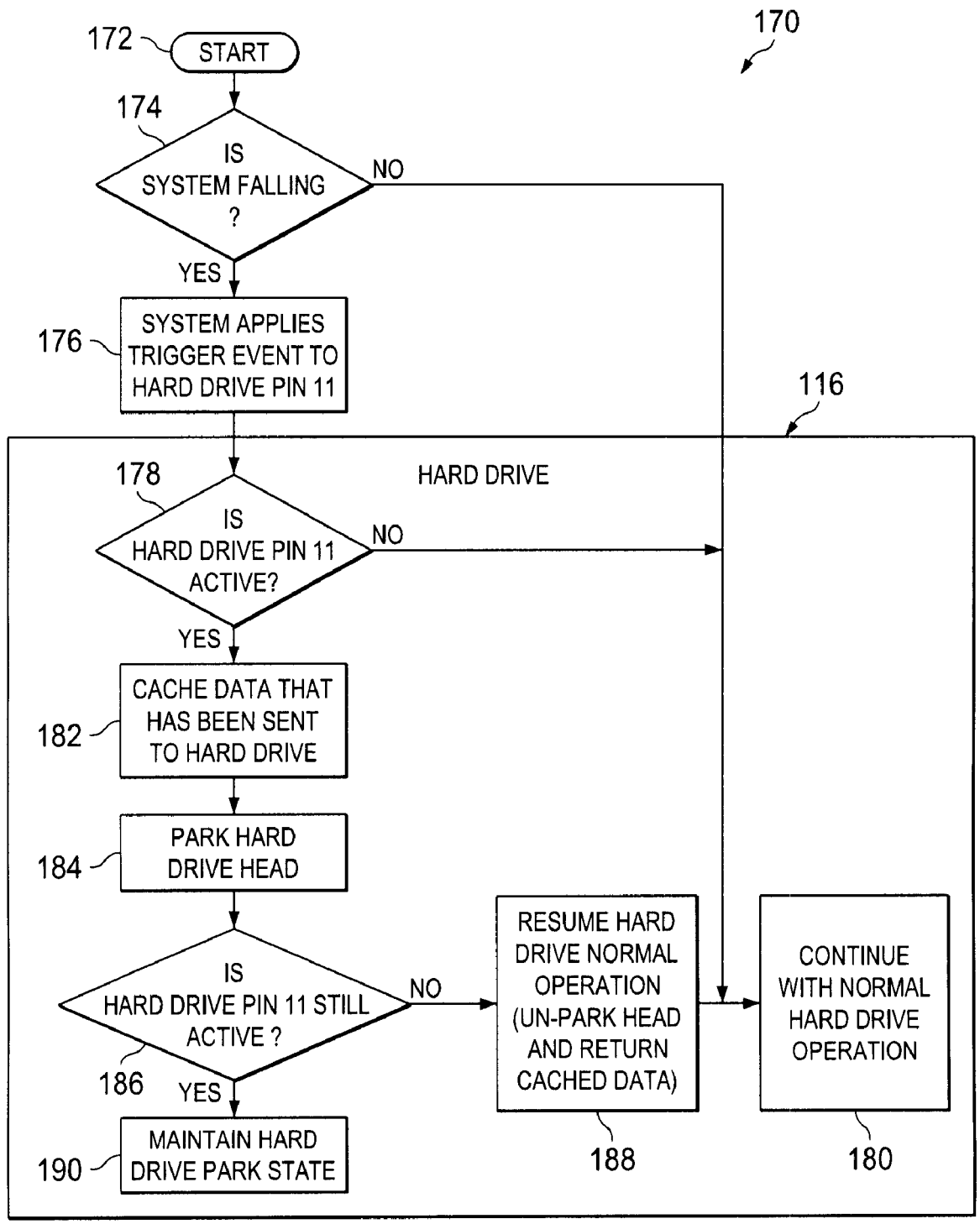
FIG. 3 illustrates an embodiment of a method to protect data and a data storage device (e.g., the HDD of FIGS. 1-2) during a fall.

FIG. 3 illustrates an embodiment of a method 170 to protect information and the HDD 116 during a drop or fall. The method 170 starts at 172 where the IHS 100 is operating after the POST and after the re-mapping of the GPIO (e.g., pin 11 of the HDD 116) 116A. It is noted that any input to the HDD 116 may be used for the interrupt trigger 136 to signal that the IHS 100 is falling. The method 170 proceeds to decision block 174 to determine whether the IHS 100 is falling. In an embodiment, this decision is made depending on whether the pin 11 GPIO 116A is electrically ground or not as described with respect to the emergency park routine 162. If no, the method 170 determines that the IHS 100 is not falling, the method 170 proceeds to block 180 where the IHS 100 continues with normal HDD 116 operation. On the other hand, if yes, the method 170 determines that the IHS 100 is falling, the method 170 proceeds to block 176 where the method 170 performs an interrupt trigger 136 to pin 11 GPIO 116A of the HDD 116. The method 170 then proceeds to decision block 178 where the method 170 determines whether pin 11 GPIO 116A is active (e.g., electrically not ground). If no, the method 170 determines that pin 11 GPIO 116A is not active, the method 170 proceeds to block 180. On the other hand, if yes, the method 170 determines that pin 11 GPIO 116A is active, the method 170 proceeds to block 182 where the drive controller 140 of the HDD 116 caches data that has been sent to or from the HDD 116. The method 170 then proceeds to block 184 where the drive controller 140 of the HDD 116 instructs the servo controller 146 to park the drive head 144 away from the media platter 154. Then, the method 170 proceeds to decision block 186 to determine whether the pin 11 GPIO 116A is still active or not. If no, the method 170 determines that the pin 11 GPIO 116A is not still active, the method 170 proceeds to block 188 where the HDD 116 resumes normal operation and then continues normal operation at block 180. On the other hand, if yes, the method 170 determines that the pin 11 GPIO 116A is still active, the method 170 proceeds to block 190 where the method 170 maintains the HDD 116 in the emergency parked state.

In an embodiment, fall sensor 134 is incorporated into the IHS 100 at a system level using an interrupt signal as the interrupt trigger 136 to the HDD 116 to activate the emergency head park routine 162. It is contemplated that embodiments of the present disclosure are to be used in high-end as well as in lower-end commodity HDDs 116. As should be understood, high volume usage of the present disclosure may allow for lower commodity pricing. The fall sensor 134 may also be utilized as a general IHS 100 system level sensor for free fall protection which may be incorporated on many HDDs 116. In practice, using an accelerometer as the fall sensor 134 that is directly coupled to the HDD as an interrupt allows for a less than 160 ms response time or approximately 5" worth of fall to react.

The traditional SATA HDD specification defines pin 11, 116A of the traditional power connector for an HDD (e.g., HDD 16) as an HDD general purpose input/output (GPIO) pin. Per the SATA specification, the specified purpose of this pin, 116A is for a delayed HDD spin-up (input) (e.g., when multiple HDDs are used in an IHS to reduce electrical start-up current when the spindle motors 152 start) and as an HDD activity drive circuit for an external LED (output) when the HDD 116 is active. In a notebook type IHS (e.g., IHS 1000) it is not common practice in the art to utilize the pin 11, 116A to stagger spin-up of the HDD 116 because most notebook type IHSs have only one HDD 116. Therefore, in the present disclosure the input function of pin 11, 116A of a SATA HDD 116 is to be utilized as an interrupt trigger 136 to initiate an emergency read/write head park routine 162. In this fashion, the fall sensor 134 (e.g., an accelerometer) can be mounted on the motherboard of a notebook type IHS (e.g., the IHS 100). In an embodiment, the fall sensor 134 is connected to one of the embedded system processors for programming a trip threshold. Then, the fall sensor 134 is utilized to detect a system free fall event. Upon detection of a fall of the IHS 100, the sensor output pin will output an interrupt trigger 136 to activate the input pin 116A on the HDD 116. This activation will instigate the emergency read/write head park routine within the HDD 116. In an embodiment, a direct interrupt to the HDD 116 is used if the free fall sensor 134 is embedded on the system side.

In an embodiment, the firmware of an HDD 116 is modified with an emergency park routine 162 that is similar to emergency park routines utilized in traditional high performance HDDs having internal fall sensors, such as the one shown in FIG. 6. This emergency park routine 162 is instigated upon activation of the pin 11 GPIO 116. In an embodiment, an interrupt trigger input to the pin 11 GPIO 116 will interrupt all HDD activity, cache data in flight and immediately move the read/write head 144 off of the media platter 154 to its park position.

In industry, many lower priced HDDs (e.g., HDD 116) have all necessary hardware hooks and etc. to enable pin 11, 116A as an interrupt pin. In an embodiment, these HDDs (e.g., HDD 116) can be manufactured with specific proprietary firmware that incorporates an emergency park routine (e.g., emergency park routine 162). The emergency park routine 162 may be activated by the fall sensor 134, and thus trigger the emergency park routine 162 that is internal to the HDD 116. This emergency park routine 116 may be remapped for external activation by the pin 11 GPIO 116A. Conventional HDDs can be used with the present disclosure as long as a non-ground connection to pin 11, or other GPIO pin, is used for an interrupt trigger 136. In an embodiment, the HDD firmware discussed herein can be used in non-sensor enabled IHS systems so that the firmware is backwards compatible with the non-sensor enabled IHS systems. It should be understood by those having ordinary skill in the art that using a system fall sensor, such as the fall sensor 134, allows a computer manufacturer to control the algorithm for using the sensor, thereby providing a consistent user experience. In addition, a system side algorithm allows for user interaction of the trigger sensitivity.

As should be understood a benefit of the present disclosure is to enable free fall HDD protection in notebook IHSs at lower commodity HDD pricing. In addition, the fall sensor 134 is incorporated at a system level so that the accelerometer can be utilized for other system level orientation and vibration detect routines. It is believed that IHS systems that ship with free fall sensing HDD protection have a lower data corruption and lower shock failure rates than HDD systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data storage device comprising:
a rotatable media platter operable to receive and store data;
a read/write head operable to communicate with the media platter by writing the data to the media platter and by reading the data from the media platter;
an arm supporting the read/write head;
a servo motor coupled the arm and operable to move the arm to and from the media platter;
a drive controller operable to control the media platter, the read/write head and the servo motor; and
a general purpose input/output (GPIO) coupled with a fall sensor that is external to the data storage device so that when the fall sensor sends a floating interrupt trigger, signaling that the fall sensor is falling, the GPIO receives the interrupt trigger and the drive controller performs an emergency routine to cache data in flight to or from the data storage device and park the read/write head away from the media platter.

2. The data storage device of claim 1, wherein the data storage device is a hard disk drive and the emergency routine is performed in less than 160 milliseconds.

3. The data storage device of claim 1, wherein the data storage device is a Serial Advanced Technology Attachment (SATA) type data storage device.

4. The data storage device of claim 1, wherein when the GPIO is pulled to electrical ground, the drive controller spins-up the media platter without delay.

5. The data storage device of claim 1, wherein a ground received on the GPIO before a power-on self test (POST) causes the drive controller to delay a spin-up of the media platter and a non-ground signal received on the GPIO after the POST causes the emergency routine to cache data in flight to or from the data storage device and park the read/write head away from the media platter.

6. The data storage device of claim 1, wherein the fall sensor is a three-axis accelerometer.

7. The data storage device of claim 1, wherein the GPIO is pin 11 on a Serial Advanced Technology Attachment (SATA) type data storage device.

8. An information handling system (IHS) comprising:
a processor;
memory coupled with the processor; and
a data storage device coupled with the processor, the data storage device further comprising:
a rotatable media platter operable to receive and store data;
a read/write head operable to communicate with the media platter by writing the data to the media platter and by reading the data from the media platter;
an arm supporting the read/write head;
a servo motor coupled the arm and operable to move the arm to and from the media platter;
a drive controller operable to control the media platter, the read/write head and the servo motor; and
a general purpose input/output (GPIO) coupled with a fall sensor that is external to the data storage device so that when the fall sensor sends a non-ground interrupt trigger, signaling that the fall sensor is falling, the GPIO receives the interrupt trigger and the drive controller performs an emergency routine to cache data in flight to or from the data storage device and park the read/write head away from the media platter.

9. The IHS of claim 8, wherein the data storage device is a hard disk drive and the emergency routine is performed in less than 160 milliseconds.

10. The IHS of claim 8, wherein the data storage device is a Serial Advanced Technology Attachment (SATA) type data storage device.

11. The IHS of claim 8, wherein when the GPIO is pulled to electrical ground, the drive controller spins-up the media platter without delay.

12. The IHS of claim 8, wherein a ground received on the GPIO before a power-on self test (POST) causes the drive controller to delay a spin-up of the media platter and a non-ground signal received on the GPIO after the POST causes the emergency routine to cache data in flight to or from the data storage device and park the read/write head away from the media platter.

13. The IHS of claim 8, wherein the fall sensor is a three-axis accelerometer.

14. The IHS of claim 8, wherein the GPIO is pin 11 on a Serial Advanced Technology Attachment (SATA) type data storage device.

15. A method comprising:
providing a data storage device, wherein the data storage device comprises:
a rotatable media platter operable to receive and store data;
a read/write head operable to communicate with the media platter by writing the data to the media platter and by reading the data from the media platter;
an arm supporting the read/write head;
a servo motor coupled the arm and operable to move the arm to and from the media platter;
a drive controller operable to control the media platter, the read/write head and the servo motor; and
a general purpose input/output (GPIO);
coupling the GPIO with a fall sensor that is external to the data storage device;
receiving via the GPIO a floating interrupt trigger from the fall sensor, signaling that the fall sensor is falling; and
performing an emergency routine by the drive controller to cache data in flight to or from the data storage device and park the read/write head away from the media platter.

16. The method of claim 15, wherein the data storage device is a hard disk drive and the emergency routine is performed within approximately 160 milliseconds.

17. The method of claim 15, wherein the data storage device is a Serial Advanced Technology Attachment (SATA) type data storage device.

18. The method of claim 15, wherein when the GPIO is pulled to electrical ground, the drive controller spins-up the media platter without delay.

19. The method of claim 15, wherein a ground received on the GPIO before a power-on self test (POST) causes the drive controller to delay a spin-up of the media platter and a non-ground signal received on the GPIO after the POST causes the emergency routine to cache data in flight to or from the data storage device and park the read/write head away from the media platter.

20. The method of claim 15, wherein the fall sensor is a three-axis accelerometer and the GPIO is pin 11 on a Serial Advanced Technology Attachment (SATA) type data storage device.

* * * * *